US011535794B1

(12) United States Patent
Abdulrazzaq et al.

(10) Patent No.: US 11,535,794 B1
(45) Date of Patent: Dec. 27, 2022

(54) VISCOELASTIC SURFACTANT-BASED TREATMENT FLUIDS FOR USE WITH LOST CIRCULATION MATERIALS

(71) Applicant: Halliburton Energy Services, Inc., Houston, TX (US)

(72) Inventors: Waseem Abdulrazzaq, Al-Aqrabia (SA); Jay Paul Deville, Spring, TX (US); Siham Kamal Fatani, Dammam (SA); Ayoub Ibrahim Awaji, Dhahran (SA); Azhar Ahmed Alhasawi, Dhahran (SA); Rawan Jawad ALameer, Dhahran (SA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/378,234

(22) Filed: Jul. 16, 2021

(51) Int. Cl.
| | |
|---|---|
| *C09K 8/84* | (2006.01) |
| *C09K 8/74* | (2006.01) |
| *C09K 8/94* | (2006.01) |
| *C09K 8/60* | (2006.01) |
| *E21B 43/22* | (2006.01) |
| *E21B 33/13* | (2006.01) |

(52) U.S. Cl.
CPC ............... *C09K 8/845* (2013.01); *C09K 8/602* (2013.01); *C09K 8/74* (2013.01); *C09K 8/94* (2013.01); *E21B 33/13* (2013.01)

(58) Field of Classification Search
CPC ...... C09K 8/68; C09K 2208/30; C09K 8/506; C09K 2208/26; E21B 21/003; E21B 33/138; E21B 43/26; E21B 43/04; E21B 43/16
See application file for complete search history.

(56) References Cited

U.S. PATENT DOCUMENTS

| | | | |
|---|---|---|---|
| 7,207,388 B2 | 4/2007 | Samuel et al. | |
| 9,353,306 B2 | 5/2016 | Svoboda et al. | |
| 10,138,165 B2 | 11/2018 | Sarmah et al. | |
| 2003/0166471 A1 | 9/2003 | Samuel et al. | |
| 2011/0083902 A1 | 4/2011 | Huang et al. | |
| 2016/0298028 A1 | 10/2016 | Singh et al. | |

(Continued)

FOREIGN PATENT DOCUMENTS

| | | |
|---|---|---|
| AU | 2002365886 A1 | 6/2003 |
| WO | 2020117268 A1 | 6/2020 |

OTHER PUBLICATIONS

Foreign Communication from Related Application—International Search Report and Written Opinion of the International Searching Authority, International Application No. PCT/US2021/042967, dated Jul. 23, 2021, 10 pages.

(Continued)

*Primary Examiner* — Zakiya W Bates
(74) *Attorney, Agent, or Firm* — Conley Rose, P.C.; Rodney B. Carroll

(57) ABSTRACT

Compositions of lost circulation materials and methods for using the same in subterranean formations can include introducing a treatment fluid into a wellbore penetrating at least a portion of a subterranean formation including a loss zone, the treatment fluid including an aqueous base fluid, at least one viscoelastic surfactant, at least one component selected from the group consisting of: a divalent salt, a metal salt, a metal oxide, and any combination thereof, and a lost circulation material; and allowing the treatment fluid to at least partially plug the loss zone.

19 Claims, 3 Drawing Sheets

(56) References Cited

U.S. PATENT DOCUMENTS

| | | |
|---|---|---|
| 2016/0355723 A1 | 12/2016 | Yadav et al. |
| 2019/0055445 A1 | 2/2019 | Kulkarni et al. |
| 2019/0316022 A1 | 10/2019 | Reddy |
| 2019/0367800 A1 | 12/2019 | Oliveira et al. |

OTHER PUBLICATIONS

Foreign Communication from Related Application—International Search Report and Written Opinion of the International Searching Authority, International Application No. PCT/US2021/042983, dated Jul. 16, 2021, 10 pages.

Guancheng, Jiang et al., "Magnesium oxysulfate cement as a fast curing agent in drilling fluids to solve the severe loss," Petroleum Science and Technology, Feb. 27, 2021, vol. 39, No. 7-8, pp. 216-234, Taylor & Francis Group.

Filing Receipt, Specification and Drawings for U.S. Appl. No. 17/378,331, filed Jul. 16, 2021, entitled "Viscoelastic Surfactant-Based Treatment Fluids for Use with Metal Oxide-Based Cements," 41 pages.

Electronic Acknowledgment Receipt, Specification and Drawings for International Application No. PCT/US2021/42967, entitled "Viscoelastic Surfactant-Based Treatment Fluids for Use with Lost Circulation Materials," filed Jul. 23, 2021, 41 pages.

Electronic Acknowledgment Receipt, Specification and Drawings for International Application No. PCT/US2021/42983, entitled "Viscoelastic Surfactant-Based Treatment Fluids for Use with Metal Oxide-Based Cements," filed Jul. 23, 2021, 39 pages.

Savari, Sharath, Jacques Butcher, and Mustafa Al-Hulail. "Managing Lost Circulation in Highly Fractured, Vugular Formations: Engineered Usage of High Fluid Loss Squeeze and Reticulated Foam Lost Circulation Materials." IADC/SPE International Drilling Conference and Exhibition. OnePetro, 2020.

Dupriest, Fred E., et al. "Method to eliminate lost returns and build integrity continuously with high-filtration-rate fluid." IADC/SPE drilling conference. OnePetro, 2008.

Savari, Sharath, et al. "Reticulated Foam Enhanced High Fluid Loss Squeeze LCM for Severe Lost Circulation Management in Highly Fractured Formations." SPE Deepwater Drilling and Completions Conference. OnePetro, 2016.

VISCOELASTIC SURFACTANT-BASED TREATMENT FLUIDS FOR USE WITH LOST CIRCULATION MATERIALS

CROSS-REFERENCE TO RELATED APPLICATIONS

The present application is related to co-pending U.S. application Ser. No. 17/378,331 filed on Jul. 16, 2021, and entitled "Viscoelastic Surfactant-Based Treatment Fluids For Use With Metal Oxide-Based Cements," the entire disclosure of which is incorporated herein by reference.

BACKGROUND

The present disclosure relates to compositions including lost circulation materials and methods for using the same in subterranean formations.

Treatment fluids are used in a variety of operations that may be performed in subterranean formations. As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids often are used in, e.g., well drilling, completion, and stimulation operations. Examples of such treatment fluids include, inter alia, drilling fluids, well cleanup fluids, workover fluids, conformance fluids, cementing fluids, gravel pack fluids, acidizing fluids, fracturing fluids, spacer fluids, and the like.

Treatment fluids used in servicing a wellbore may be lost to the subterranean formation while circulating in the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluid may be more difficult to achieve.

In some drilling operations when lost circulation is observed, the wellbore may be treated with lost circulation materials for plugging the portion of formation through which the fluids are being lost. A variety of lost circulation materials have been used or proposed for arresting lost circulation of drilling fluids. However, in some instances, the lost circulation may be so severe that traditional lost circulation materials are not effective at arresting lost circulation.

To provide a desired viscosity, polymeric and/or clay viscosifiers are commonly added to treatment fluids including lost circulation materials. Examples of commonly used polymeric and/or clay viscosifiers include, but are not limited to, guar gums and derivatives thereof, xanthan gums and derivatives thereof, cellulose derivatives, biopolymers, organophilic clay and the like. The use of polymeric and/or clay viscosifiers, however, sometimes may be problematic. For instance, these viscosifiers may leave residues in the subterranean formation after use, which may require potentially costly remedial operations to clean up the formation pores and pore throat, fracture face and proppant pack. Foamed treatment fluids and emulsion-based treatment fluids have been employed to minimize residual damage, but increased expense and complexity may result from their use.

BRIEF DESCRIPTION OF THE FIGURES

These figures illustrate certain aspects of some of the embodiments of the present disclosure and should not be used to limit or define the claims.

Figure 1:
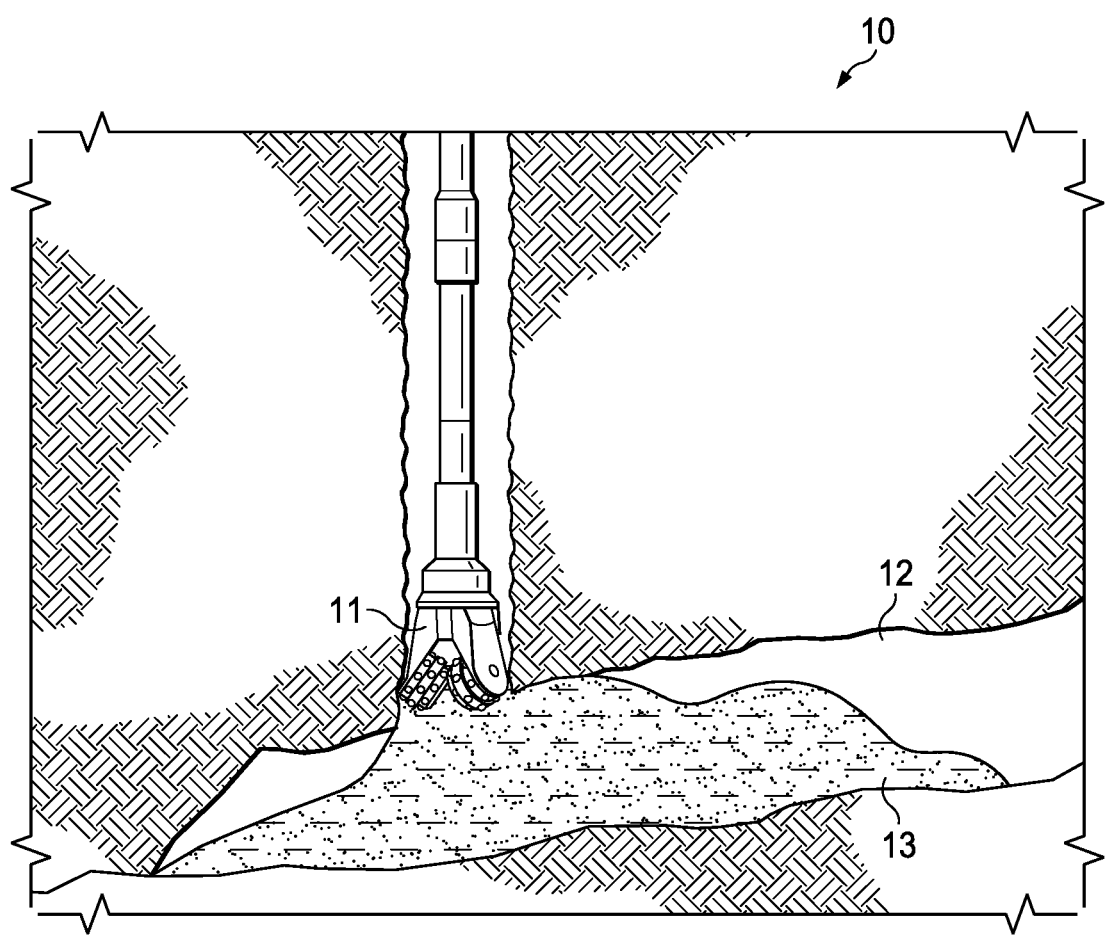
FIG. 1 is a schematic diagram of subterranean formation in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

As used herein, "loss zone" refers to a portion of a subterranean formation into which fluids circulating in a wellbore may be lost. In certain embodiments, loss zones may include voids, vugular zones, wash-outs, lost circulation zones, perforations, natural fractures, induced fractures, and any combination thereof.

As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

The present disclosure relates to compositions including lost circulation materials and methods for using the same in subterranean formations. More specifically, the present disclosure relates to compositions of and methods for using treatment fluids including an aqueous base fluid; at least one viscoelastic surfactant; at least one component selected from the group consisting of: a divalent salt, a metal salt, a metal oxide and any combination thereof and a lost circulation material in subterranean formations. The methods of the present disclosure generally include introducing a treatment fluid into a wellbore penetrating at least a portion of a subterranean formation including a loss zone, the treatment fluid including: an aqueous base fluid, at least one viscoelastic surfactant, at least one component selected from the group consisting of: a divalent salt, a metal salt, a metal oxide and any combination thereof, and a lost circulation material; and allowing the treatment fluid to at least partially plug the loss zone. The present disclosure also provides a treatment fluid including an aqueous base fluid; at least one viscoelastic surfactant; at least one component selected from the group consisting of: a divalent salt, a metal salt, a metal oxide and any combination thereof; and a lost circulation material. In certain embodiments, the present disclosure includes introducing a first treatment fluid into a wellbore penetrating at least a portion of a subterranean formation, the first treatment fluid including an aqueous base fluid, a viscoelastic surfactant fluid, at least one component selected from the group consisting of: a divalent salt, a metal salt, a metal oxide, and any combination thereof, and a lost circulation material; forming a filter cake or a plug including at least a portion of the lost circulation material in at least the portion of the subterranean formation; introducing a second treatment fluid including an acid into the wellbore; and allowing the second treatment fluid to contact at least a portion of the filter cake or plug, wherein at least the portion of the filter cake or plug at least partially degrades in response to contacting the second treatment fluid.

Among the many advantages to the methods and compositions of the present disclosure, only some of which are alluded to herein, the methods and compositions of the present disclosure may, among other benefits, provide treatment fluids including at least one viscoelastic surfactant that may be more compatible with lost circulation materials as compared to certain other treatment fluids. For example, in certain embodiments, the treatment fluids of the present disclosure may provide an enhanced ability to plug a loss zone by allowing a lost circulation material to be introduced to a subterranean formation while avoiding undesirable flowability, foaming, filter cake and/or dewatering properties. In certain embodiments, the treatment fluids of the present disclosure may provide an enhanced ability to plug a loss zone by allowing a substantially polymer-free and/or substantially clay-free introduction of a lost circulation material. Thus, in some embodiments, the treatment fluids of the present disclosure may be substantially polymer-free and/or substantially clay-free. In certain embodiments, this may at least in part avoid the problems associated with polymer-based and clay-based treatment fluids (e.g. undesirable residue in the subterranean formation after use). In certain embodiments, the treatment fluids of the present disclosure may provide an enhanced ability to plug a loss zone by providing a lost circulation material that at least partially degrades or dissolves in response to contact with an acidic fluid. In certain embodiments, this may simplify removal of the lost circulation material during completion operations. In certain embodiments, the treatment fluids of the present disclosure may provide an enhanced ability to plug a loss zone by allowing a lighter load of lost circulation material to be used as compared to certain other treatment fluids (e.g., from about 60 pounds per barrel (ppb) to about 80 ppb, as compared to about 120 ppb for certain other treatment fluids).

Treatment fluids typically contain additives to impart desired physical and/or chemical characteristics to the fluid. Lost circulation materials may prevent or lessen the loss of circulation fluids from a wellbore. The lost circulation materials of the present disclosure may be used in a variety of applications and environments in which plugging a loss zone may be important. Examples of applications suitable for certain embodiments of the present disclosure may include, but are not limited to use in subterranean formations, and/or downhole applications (e.g., drilling, fracturing, completions, oil production). In certain embodiments, lost circulation materials may be applicable to injection wells, monitoring wells, and/or production wells, including hydrocarbon or geothermal wells and wellbores. In other embodiments, the lost circulation materials may be introduced into a subterranean formation, for example, via a wellbore penetrating at least a portion of a subterranean formation. Addressing fluid loss that occurs during drilling or other downhole operations may be important for achieving the service of the fluid and/or mitigating or preventing severe to total lost circulation.

In certain embodiments, a treatment fluid including an aqueous base fluid, at least one viscoelastic surfactant, at least one component selected from the group consisting of: a divalent salt, a metal salt, a metal oxide, and any combination thereof, and a lost circulation material may be provided. Depending on the type of treatment to be performed, the treatment fluid may include any treatment fluid known in the art. Treatment fluids that may be useful in accordance with the present disclosure include, but are not limited to, drilling fluids, cement fluids, lost circulation fluids, stimulation fluids (e.g., a fracturing fluids or an acid stimulation fluids), completion fluids, conformance fluids (e.g., water or gas shutoff fluids), sand control fluids (e.g., formation or proppant consolidating fluids), workover fluids, and/or any combination thereof.

In certain embodiments, a treatment fluid including an aqueous base fluid, at least one viscoelastic surfactant, at least one component selected from the group consisting of: a divalent salt, a metal salt, a metal oxide, and any combination thereof, and a lost circulation material may be introduced into a location (e.g. into at least a portion of a subterranean formation). In certain embodiments, the treatment fluid including the aqueous base fluid, the at least one viscoelastic surfactant, at least one component selected from the group consisting of: a divalent salt, a metal salt, a metal oxide, and any combination thereof, and the lost circulation material may at least partially plug a loss zone at elevated temperatures, e.g. a temperature corresponding to a temperature in a loss zone. In certain embodiments, the treatment fluid including the aqueous base fluid, the at least one viscoelastic surfactant, at least one component selected from the group consisting of: a divalent salt, a metal salt, a metal oxide, and any combination thereof, and the lost circulation material may be pumped downhole and squeezed. In other embodiments, the treatment fluid including the aqueous base fluid, the at least one viscoelastic surfactant, at least one component selected from the group consisting of: a divalent salt, a metal salt, a metal oxide, and any combination thereof, and the lost circulation material may be simply pumped into the subterranean formation. In certain embodiments, the lost circulation material may entirely fill the loss zone. In certain embodiments, the lost circulation material may be applied as a substantially full concentration spacer or pill. For example, with reference to FIG. 1, subterranean formation 10 may include drill bit 11. In certain embodiments, drill bit 11 may break into loss zone 12. In certain embodiments, the treatment fluids of the present disclosure 13 may be pumped into loss zone 12 to at least partially plug the loss zone.

The treatment fluids of the present disclosure may include any aqueous base fluid known in the art. As used herein, the term "base fluid" refers to the major component of the fluid (as opposed to components dissolved and/or suspended therein), and does not indicate any particular condition or property of that fluid such as its mass, amount, pH, etc. Aqueous base fluids that may be suitable for use in the methods and compositions of the present disclosure may include water from any source. This may include fresh water, salt water (e.g., water containing one or more salts dissolved therein), brine (e.g., saturated salt water), seawater, or any combination thereof. The aqueous base fluid may be from a source that does not contain compounds that adversely affect other components of a fluid. In certain embodiments of the present disclosure, an aqueous base fluid may include one or more ionic species, such as those formed by salts dissolved in water. For example, seawater and/or produced water may include a variety of divalent cationic species dissolved therein. In certain embodiments, the density of the aqueous base fluid may be adjusted, among other purposes, to provide additional particulate transport and suspension in the treatment fluids of the present disclosure. In certain embodiments, the pH of the aqueous base fluid may be adjusted (e.g., by a buffer or other pH adjusting agent) to a specific level, which may depend on, among other factors, the types of lost circulation materials, and/or other additional additives included in a fluid. One of ordinary skill in the art, with the benefit of this disclosure, will recognize when such density and/or pH adjustments are appropriate. In certain embodiments, the treatment fluids may include a mixture of one or more fluids and/or gases, including but not limited to emulsions, foams, and the like.

Surfactants are compounds that lower the surface tension of a liquid, the interfacial tension between two liquids, or that between a liquid and a solid. Surfactants may act as detergents, wetting agents, emulsifiers, foaming agents, and dispersants. Surfactants are usually organic compounds that are amphiphilic, meaning they contain both hydrophobic groups ("tails") and hydrophilic groups ("heads"). Therefore, a surfactant may contain both a water-insoluble (or oil soluble) portion and a water-soluble portion.

In a water phase, surfactants may form aggregates, such as micelles, where the hydrophobic tails form the core of the aggregate and the hydrophilic heads are in contact with the surrounding liquid. The aggregates may be formed in various shapes such as spherical or cylindrical micelles or bilayers. The shape of the aggregates depends on the chemical structure of the surfactants, depending on the balance of the sizes of the hydrophobic tail and hydrophilic head. As used herein, the term "micelle" includes any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure.

Certain types of surfactants may impart viscosity and/or elasticity to a fluid. Such a surfactant is referred to as a "viscoelastic surfactant" ("VES"). When used as a viscosity-increasing agent, the molecules (or ions) of the surfactant associate to form micelles of a certain micellar structure (e.g., rod-like, worm-like, vesicles, etc., which are referred to herein as "viscosifying micelles") that, under certain conditions (e.g., concentration, ionic strength of the fluid, etc.) may be capable of, inter alia, imparting increased viscosity to a particular fluid or forming a gel. Certain viscosifying micelles may impart increased viscosity to a fluid such that the fluid exhibits viscoelastic properties (e.g., shear thinning properties) due, at least in part, to the association of the surfactant molecules contained therein.

Viscoelastic surfactants may be particularly suitable for certain applications due to, inter alia, their less-damaging nature towards a subterranean formation as compared to, for example, crosslinked polymer fluids. Viscoelastic surfactants develop viscosity by aggregation of surfactant molecules that demonstrate similar properties to polymers. The viscoelastic surfactant may break down easily on dilution or contact with oil, thereby leaving negligible residue in the reservoir. However, particulate lost circulation materials may show sensitivity to viscoelastic surfactants that lead to undesirable properties of a treatment fluid including compatibility, flowability, foaming and dewatering.

The viscoelastic surfactant used in accordance with the methods and compositions of the present disclosure may include any suitable viscoelastic surfactant that is capable of imparting viscoelastic properties to an aqueous fluid. The viscosity of a fluid that includes one or more viscoelastic surfactants may depend on various factors such as the structure of the surfactant, nature of the counter ion, temperature, and presence of water-insoluble components. The viscoelastic surfactant may be cationic, anionic, or amphoteric in nature, and include any number of different compounds, including ester sulfonates, methyl ester sulfonates, hydrolyzed keratin, sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, sulfobetaines, alkylamidobetaines (e.g., cocoamidopropyl betaine), quaternary ammonium compounds (e.g., trimethyltallowammonium chloride, trimethylcocoammonium chloride), derivatives thereof, and combinations thereof. The term "derivative" is defined herein any compound that is made from one of the listed compounds, for example, by replacing one atom in one of the listed compounds with another atom or group of atoms, ionizing one of the listed compounds, or creating a salt of one of the listed compounds. The viscoelastic surfactant may include, but is not limited to, ACAR-13019 and/or ACAR-21008 (available from Nouryon), and any combination thereof.

The viscoelastic surfactant should be present in an amount sufficient to provide the desired viscosity to a treatment fluid (e.g., sufficient viscosity to divert flow, reduce fluid loss, suspend particulates, etc.) therein through formation of viscosifying micelles.

In certain embodiments, the viscoelastic surfactant may be present in a treatment fluid in an amount in the range from about 0.1% to about 20% by weight of the treatment fluid. In certain embodiments, the viscoelastic surfactant may be present in a treatment fluid in an amount in the range from about 0.5% to about 10% by weight of the treatment fluid. In certain embodiments, the viscoelastic surfactant may be present in a treatment fluid in an amount in the range from about 2% to about 10% by weight of the treatment fluid.

The divalent salt used in accordance with certain embodiments of the methods and compositions of the present disclosure may be any water-soluble divalent salt. Suitable divalent salts may include magnesium, calcium, or zinc cations, and chloride, bromide, iodide, formate, nitrate, acetate, cyanate, or thiocyanate anions. Examples of divalent salts that may be suitable that include the above-listed anions and cations include, but are not limited to calcium bromide, calcium chloride, calcium nitrate, calcium formate, magnesium chloride, magnesium bromide, zinc chloride, and zinc bromide. In certain embodiments, the divalent salt may be present in the treatment fluid of the present invention in an amount in the range of from about 1% to about 50% by weight of the treatment fluid. In certain other embodiments, the divalent salt may be present in the treatment fluids of the present invention in an amount in the range of from about 1% to about 10% by weight of the treatment fluid.

In certain embodiments, the metal salt and/or the metal oxide used in accordance with certain embodiments of the methods and compositions of the present disclosure may be components of a Sorel cement, otherwise known as magnesium oxychloride cement. Sorel cement is a non-hydraulic cement that typically includes a mixture of a metal oxide such as magnesium oxide (burnt magnesia) with a salt such as magnesium chloride. Sorel cements may be removed with minimal damage to subterranean zones or formations by dissolution in acids. Sorel cement generally includes $MgCl_2$ or $MgCl_2.6H_2O$. However, there are variants that can be made with phosphates or sulfates. Sorel cement may include a metal oxide and a soluble metal salt. In certain embodiments, the metal oxide may include, but is not limited to magnesium oxide, zinc oxide, and the like, and any combination thereof. In certain embodiments, the metal salt may include, but is not limited to a chloride salt, a sulfate salt, a phosphate salt, and the like, or any combination thereof.

In some embodiments, a treatment fluid may include a metal salt. Metal salts suitable for certain embodiments of the present disclosure include, but are not limited to a chloride salt, a phosphate salt, a sulfate salt, or any combination thereof. In some embodiments, the treatment fluid includes an alkaline earth metal chloride such as magnesium chloride ($MgCl_2$) or magnesium chloride hexahydrate, $MgCl_2.6H_2O$. In certain embodiments, for example, the sulfate salt may include magnesium sulfate ($MgSO_4$). In certain embodiments, the sulfate salt may include, but is not limited to $MgSO_4$, $MgSO_4.2H_2O$, $MgSO_4.4H_2O$, $MgSO_4.5H_2O$, $MgSO_4.6H_2O$, $MgSO_4.7H_2O$, $MgSO_4.11H_2O$, and the like, or any combination thereof.

In one or more embodiments, the metal salt may be present in a treatment fluid in an amount within a range of from about 0.1% to about 30% by weight of the treatment fluid (e.g., about 1%, about 5%, about 10%, about 15%, about 20%, about 25%, about 30%, etc., all by weight of the treatment fluid). In other embodiments, the metal salt may be present in a treatment fluid in an amount within a range of from about 1% to about 20% by weight of the treatment fluid. In one or more embodiments, the metal salt may be present in the treatment fluid in an amount within a range of from about 5% to about 20% by weight of the treatment fluid. In some embodiments, the metal salt may be present in the treatment fluid in an amount within a range of from about 10% to about 20% by weight of the treatment fluid. In certain embodiments, the metal salt may be present in the treatment fluid in an amount in an amount within a range of from about 10% to about 15% by weight of the treatment fluid.

In certain embodiments, the metal salt used in accordance with the methods and compositions of the present disclosure is magnesium sulfate heptahydrate ($MgSO_4\ 7H_2O$). In certain embodiments, the magnesium sulfate heptahydrate may be present in the treatment fluid of the present invention in an amount in the range from about 10% to about 20% by weight of the treatment fluid.

In some embodiments, a treatment fluid may include a metal oxide. The metal oxide used in accordance with the methods and compositions of the present disclosure may include magnesium oxide (MgO). Such MgO may be produced, for example, via calcination of $Mg(OH)_2$. The calcination of $Mg(OH)_2$ results in what is commonly referred to as "burned" MgO. Three basic grades of burned MgO are typically produced with the differences between each grade related to the degree of reactivity remaining after being exposed to a range of high temperatures. The original magnesium hydroxide particle is usually a large and loosely bonded particle.

Exposure to thermal degradation by calcination may cause the $Mg(OH)_2$ to alter its structure so that the surface pores are slowly filled in while the particle edges become more rounded. This results in MgO with varying degrees of crystallinity and consequently varying degrees of reactivity. When the MgO is produced by calcining to temperatures ranging between 1500° C.-2000° C. the MgO is referred to as "dead-burned" since the majority of the reactivity has been eliminated. Dead-burned MgO has the highest degree of crystallinity of the three grades of burned MgO. A second type of MgO is produced by calcining at temperatures ranging from 1000° C.-1500° C. and is termed "hard-burned." Hard-burned MgO displays an intermediate crystallinity and reactivity when compared to the other two grades of burned MgO. Examples of hard-burned MgO include, without limitation, THERMATEK™ LT and THERMATEK™ HT additives, which are commercially available from Halliburton Energy Services, Inc. The third grade of MgO is produced by calcining at temperatures ranging from 700° C.-1000° C. and is termed "light-burned" or "caustic" magnesia. Light-burned MgO is characterized by a high surface area, a low crystallinity and a high degree of reactivity when compared to the other grades of burned MgO. In certain embodiments, the treatment fluids may include, but are not limited to hard-burned MgO, light-burned MgO, dead-burned MgO, or any combination thereof.

In one or more embodiments, the metal oxide may be present in a treatment fluid in an amount within a range of from about 0.1% to about 30% by weight of the treatment fluid (e.g., about 1%, about 5%, about 10%, about 15%, about 20%, about 25%, about 30%, etc., all by weight of the treatment fluid). In other embodiments, the metal oxide may be present in a treatment fluid in an amount within a range of from about 1% to about 20% by weight of the treatment fluid. In one or more embodiments, the metal oxide may be present in the treatment fluid in an amount within a range of from about 5% to about 20% by weight of the treatment fluid. In some embodiments, the metal oxide may be present in the treatment fluid in an amount within a range of from about 10% to about 20% by weight of the treatment fluid. In certain embodiments, the metal oxide may be present in the treatment fluid in an amount within a range of from about 10% to about 15% by weight of the treatment fluid.

In certain embodiments, the metal salt and/or metal oxide may be components of a Sorel cement and may be present in a treatment fluid in an amount less than that necessary to cause the Sorel cement to set. For example, the metal salt and metal oxide may each be present in a treatment fluid in an amount of less than about 20% by weight of the treatment fluid. In some embodiments, the metal salt and metal oxide may each be present in a treatment fluid in an amount within a range of from about 10% to about 20% by weight of the treatment fluid. In some embodiments, the metal salt and metal oxide may be components of a Sorel cement and may be present in a treatment fluid in an amount that is about 2, 3, 4, 5, 6, 7, 8, 9, or 10 times less than that necessary to cause the Sorel cement to set.

Without limiting the disclosure to any particular theory or mechanism, it is believed that the viscoelastic surfactant may serve as a non-damaging carrier fluid. In certain embodiments, the viscoelastic surfactant may provide suspension properties for the particulates in a treatment fluid and allow them to be delivered in certain proportions to, for example, a loss zone. In some embodiments, the treatment fluid may include a lost circulation material that may form a preliminary plug. In some embodiments, other components of the treatment fluid, for example, components of a Sorel cement, may set over time and/or temperature to provide additional strength and/or hardness to the plug.

The lost circulation material used in accordance with the compositions and methods of the present disclosure may include any particulate lost circulation material sufficient to at least partially plug a loss zone. The lost circulation material may include, but is not limited to, BaraBlend® lost circulation materials (engineered, composite solutions, available from Halliburton Energy Services, Inc.) including BaraBlend®-657, BaraBlend®-665, and BaraBlend®-680; STOPPIT® lost circulation material (engineered, composite solution, available from Halliburton Energy Services, Inc.); BaraLock®-666 lost circulation material (engineered, supplemental solution of reticulated foam material, available from Halliburton Energy Services, Inc.); and acid-soluble oyster shells. In certain embodiments, the lost circulation material may include, but is not limited to, lost circulation materials or bridging agents such as ground marble, resilient graphitic carbon, walnut shells, calcium carbonate, magnesium carbonate, limestone, dolomite, iron carbonate, iron oxide, calcium oxide, magnesium oxide, perborate salts, and the like, and any combination thereof. In certain embodiments, the lost circulation material may include, but is not limited to, BARACARB® particulates (ground marble, available from Halliburton Energy Services, Inc.) including BARACARB® 5, BARACARB® 25, BARACARB® 50, BARACARB® 150, BARACARB® 600, BARACARB®-1200; N-SEAL™ lost circulation material (an acid soluble extrusion spun mineral fiber available from Halliburton Energy Services, Inc.); STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAFLAKE® (sized, acid-soluble, calcium carbonate chips available from Halliburton Energy Services, Inc.) including BARAFLAKE® medium and BARAFLAKE® course; BARAPLUG® (sized salt water, available from Halliburton Energy Services, Inc.) including BARAPLUG® 20, BARAPLUG® 50, and BARAPLUG® 3/300.

A lost circulation material may include an engineered composite solution, a medium size reticulate foam, a course size reticulate foam, a medium size acid soluble shell and a course size acid soluble shell. The engineered composite solution may include any one of the composite solutions referenced above, or any other suitable engineered composite solution. The reticulate foams may include the BaraLock®-666 reticulate foam referenced above or any other suitable reticulate foam. The acid soluble shells may include the oyster shells referenced above, or any other suitable shell.

A suitable lost circulation material may be selected based on the size of the fracture to be treated. A person skilled in the art, with the benefit of this disclosure, will recognize the types of lost circulation material that may be added for a particular application.

In certain embodiments, the lost circulation material may include particles sized within a range of from about 1,250 U.S. mesh to about 5 U.S. mesh. In some embodiments, the lost circulation material may include particles sized within a range of from about 400 U.S. mesh to about 10 U.S. mesh. In some embodiments, the lost circulation material may include particles sized 10 U.S. mesh or smaller, sized 12 U.S. mesh or smaller, or sized 18 U.S. mesh or smaller. In certain embodiments, at least 90% of the lost circulation material particles may be sized 4 U.S. mesh or smaller. In certain embodiments, at least 50% of the lost circulation material particles may be sized 30 U.S. mesh or smaller. In certain embodiments, at least 5% of the lost circulation material particles may be sized 100 U.S. mesh or smaller. For example, in some embodiments, the lost circulation material may have a median diameter particle size distribution of from about 20 to about 100 U.S. mesh. In certain embodiments, the lost circulation material may exhibit a median diameter particle size distribution of 4 U.S. mesh or smaller, 20 U.S. mesh or smaller, 30 U.S. mesh or smaller, or 40 U.S. mesh or smaller. As used herein, references to particle sizes of a particular mesh "or larger" and grammatical equivalents thereof refers to particles of that particular mesh size and particles larger than that size. Similarly, as used herein, references to sizes of a particular mesh "or smaller" and grammatical equivalents thereof refers to particles of that particular mesh size and particles smaller than that size.

In certain embodiments, the lost circulation material may include particles having a diameter of 2,000 microns or smaller, 1,700 microns or smaller, or 1,500 microns or smaller. In some embodiments, the lost circulation material may include particles having a diameter of from about 1 micron to about 2,000 microns. In certain embodiments, the lost circulation material may exhibit a particle size distribution between about 1 micron and about 2,000 microns. For example, in some embodiments, the lost circulation material may have a median diameter particle size distribution of from about 250 microns to about 1,000 microns. In certain embodiments, the lost circulation material may exhibit a median diameter particle size distribution of 1,000 microns or smaller, 750 microns or smaller, or 500 microns or smaller.

In certain embodiments, the lost circulation materials of the present disclosure may exhibit a substantially uniform particle size distribution or a multi-modal particle size distribution. As used herein, lost circulation materials having a "substantially uniform particle size distribution" are materials in which the standard deviation of the particle sizes in a representative sample of the particles is within about 30% of the mean (number) particle size. As used herein, lost circulation materials having a "multi-modal particle size distribution" are materials in which a significant number of particles are of a size an order of magnitude removed from the mean particle size. In certain embodiments, the lost circulation materials may include a bimodal or trimodal particle size distribution. In some embodiments, the lost circulation materials may be processed by mechanically sizing, cutting or, chopping the lost circulation materials into particles using any suitable methodologies for such processes.

The lost circulation material used in accordance with the methods and compositions of the present disclosure should be present in a treatment fluid in an amount sufficient to at least partially plug a loss zone. In certain embodiments, the lost circulation material may be present in the treatment fluid in an amount from about 0.1% to about 60% by weight of the treatment fluid. In certain embodiments, the lost circulation material may be present in the treatment fluid in an amount from about 3% to about 60% by weight of the treatment fluid. In certain embodiments, the lost circulation material may be present in the treatment fluid in an amount from about 5% to about 40% by weight of the treatment fluid. In certain embodiments, the lost circulation material may be present in the treatment fluid in an amount from about 8% to about 35% by weight of the treatment fluid. In certain embodiments, the lost circulation material may be present in the treatment fluid in an amount from about 25% to about 60% by weight of the treatment fluid. In some embodiments, the lost circulation material may be present in the treatment fluid in an amount from about 0.1% to about 3%, in other embodiments, from about 3% to about 10%, in other embodiments, from about 10% to about 20%, in other embodiments, from about 20% to about 30%, in other embodiments, from about 30% to about 40%, in other embodiments, from about 40% to about 50%, and in other embodiments, from about 50% to about 60% by weight of the treatment fluid. In some embodiments, the lost circulation material may be present in the treatment fluids in an amount of from about 1 pound per barrel (ppb) to about 120 ppb (e.g., to about 1 ppb, about 5 ppb, about 10 ppb, about 15 ppb, about 20 ppb, about 25 ppb, about 30 ppb, about 35 ppb, about 40 ppb, about 45 ppb, about 50 ppb, about 55 ppb, about 60 ppb, about 65 ppb, about 70 ppb, about 75 ppb, about 80 ppb, about 85 ppb, about 90 ppb, about 95 ppb, about 100 ppb, about 105 ppb, about 110 ppb, about 115 ppb, about 120 ppb etc.). In some embodiments, the lost circulation material may be present in the treatment fluid in an amount of from about 40 ppb to about 110 ppb. In some embodiments, the lost circulation material may be present in an amount of from about 60 ppb to about 105 ppb.

In certain embodiments, the treatment fluids of the present disclosure optionally may include any number of additional additives. Examples of such additional additives include, but are not limited to, salts, additional surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, $H_2S$ scavengers, $CO_2$ scavengers, oxygen scavengers, lubricants, breakers, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

In one or more embodiments, a treatment fluid (e.g., before addition of a lost circulation material) may have a density within a range of from about 4 lbs/gallon (ppg) to about 25 ppg. In other embodiments, a treatment fluid may have a density within a range of from about 8 ppg to about 18 ppg. In yet other embodiments, a treatment fluid may have a density within a range of from about 10 ppg to about 14 ppg. Density reducing additives such as glass beads or foam and expanding additives such as gas, suspension aids, defoamers and the like may be included in a treatment fluid to generate a lightweight cement slurry. A person of skill in the art with the benefit of this disclosure would understand how to determine suitable amounts of such density-reducing additives and methods for their use.

In some embodiments, the treatment fluids of the present disclosure may optionally include a weighting agent. In some embodiments, the weighting agent may be added to produce a desired density in the treatment fluid. Examples of suitable weighting agents include, but are not limited to barite, hematite, calcium carbonate, magnesium carbonate, iron carbonate, zinc carbonate, manganese tetraoxide, ilmenite, NaCl, KCl, formate salts, and the like, and any combination thereof. These weighting agents may be at least partially soluble or insoluble in the treatment fluid. In one or more embodiments, a weighting agent may be present in the treatment fluids in an amount of from about 0.1% to about 60% by weight of the treatment fluid (e.g., about 5%, about 10%, about 15%, about 20%, about 25%, about 30%, about 35%, about 40%, about 45%, about 50%, about 55%, etc., all by weight of the treatment fluid). In other embodiments, the weighting agents may be present in the treatment fluids in an amount of from about 1% to about 35% by weight of the treatment fluid. In some embodiments, the weighting agent may be present in the treatment fluids in an amount of from about 0.1% to about 1% by weight of the treatment fluid (e.g., no more than 1%, 0.9%, 0.8%, 0.7%, 0.6%, or 0.5%, all by weight of the treatment fluid). A person skilled in the art, with the benefit of this disclosure, will recognize the types of weighting agent that may be included in the fluids of the present disclosure for a particular application.

In certain embodiments, the treatment fluids of the present disclosure may include a density-reducing additive. Examples of density-reducing additives suitable for certain embodiments of the present disclosure include, but are not limited to gas, suspension acids, defoamers, hollow glass beads, pozzolanic microspheres, solid beads (e.g., solid organic or plastic beads), or any combination thereof.

In certain embodiments, the treatment fluid does not include a significant amount (e.g., no more than 0.5%, 0.4%, 0.3%, 0.2%, 0.1%, or 0.01%, all by weight of the treatment fluid) of a bridging agent. In some embodiments, the treatment fluid is free or substantially free of particulates other than the lost circulation material. In certain embodiments, the treatment fluids of the present disclosure may include additional lost circulation materials or bridging agents. In some embodiments, additional lost circulation materials may be included in the compositions as a secondary mechanism to reduce fluid loss without altering the thixotropic behavior of the treatment fluid. Examples of additional lost circulation materials or bridging agents suitable for certain embodiments of the present disclosure include, but are not limited to ground marble, resilient graphitic carbon, walnut shells, calcium carbonate, magnesium carbonate, limestone, dolomite, iron carbonate, iron oxide, calcium oxide, magnesium oxide, perborate salts, and the like, and any combination thereof. In certain embodiments, additional lost circulation materials or bridging agents may include, but are not limited to, BARACARB® particulates (ground marble, available from Halliburton Energy Services, Inc.) including BARACARB® 5, BARACARB® 25, BARACARB® 50, BARACARB® 150, BARACARB® 600, BARACARB® 1200; STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.); BAROFIBRE® (a fibrous cellulose material available from Halliburton Energy Services, Inc.); and the like; and any combination thereof.

In certain embodiments, lost circulation materials may include a plurality of fibers. Examples of synthetic fibers suitable for certain embodiments of the present disclosure include, but are not limited to, polymers or copolymers composed of polypropylene, polyaramid, polyester, polyacrylonitrile, and polyvinyl alcohol. Examples of biodegradable fibers include, but are not limited to, fibers composed of modified cellulose, chitosan, soya, modified chitosan, polycaprolactone, polylactic acid, poly (3-hydroxybutyrate), polyhydroxy-alkanoates, polyglycolic acid "PGA", polylactic acid "PLA", polyorthoesters, polycarbonates, polyaspartic acid, polyphosphoesters, soya, or copolymers thereof. Examples of natural fibers suitable for certain embodiments of the present disclosure include, but are not limited to fibers of cellulose including viscose cellulosic fibers, oil coated cellulosic fibers, and fibers derived from a plant product like paper fibers. Examples of other suitable fibers include, but are not limited to carbon including carbon fibers; melt-processed inorganic fibers including basalt fibers, wollastonite fibers, non-amorphous metallic fibers, ceramic fibers, glass fibers, and other mineral fibers. The fibers may also be a composite fiber made from any combination of the preceding materials. A commercially-available example of suitable fibers is BAROLIFT®, sweeping agent, marketed by Halliburton Energy Services, Inc., which is a synthetic fiber. Another example of suitable fibers is N-SEAL™ lost circulation material, an acid soluble extrusion spun mineral fiber also available from Halliburton Energy Services, Inc. In certain embodiments, the fibers may have a length to diameter aspect ratio of from about 2:1 to about 5,000:1.

In certain embodiments, the treatment fluids including a lost circulation material optionally may include one or more additional surfactants. The additional surfactant may, among other purposes, help disperse the lost circulation material and/or other additives in the treatment fluid. Examples of additional surfactants that may be suitable for use may include, but are not limited to, an alkoxylated alkyl alcohol and salts thereof, an alkoxylated alkyl phenol and salts thereof, an alkyl or aryl sulfonate, a sulfate, a phosphate, a carboxylate, a polyoxyalkyl glycol, a fatty alcohol, a polyoxyethylene glycol sorbitan alkyl ester, a sorbitan alkyl ester, a polysorbate, a glucoside, a quaternary amine compound, an amine oxide surfactant, or any combination thereof.

In certain embodiments, additives or properties of the treatment fluid may impact one or more properties of the lost circulation material. For example, in some embodiments, a gas-generating additive or a set of gas-generating reactants may be included in the treatment fluids of the present disclosure. Such additives may increase the amount of gas in the fluid, reducing the density of the material. The strength of the material may be increased in certain embodiments by, for example, adding fibers to the fluid, and/or increasing the number of particles in the fluid.

The treatment fluids of the present disclosure may be prepared using any suitable method and/or equipment (e.g., blenders, mixers, stirrers, etc.) known in the art at any time prior to their use. The treatment fluids may be prepared at a well site or at an offsite location.

Certain components of the treatment fluid may be provided as a "dry mix" to be combined with a base fluid and/or other components prior to or during introducing the treatment fluid into the subterranean formation. In some embodiments, dry mix compositions may be designed to include a base fluid in an amount from about 1 to about 20 gallons per 94-lb sack of dry blend (gal/sk). In certain embodiments, dry mix compositions may be suitable for base fluids in the amount of 10 gal/sk. In some embodiments, dry mix compositions may be suitable for base fluids in the amount of 13.5 gal/sk. Embodiments of the treatment fluids of the present disclosure may be prepared in accordance with any suitable technique. In some embodiments, the desired quantity of water may be introduced into a mixer followed by the dry blend. The dry blend may include the lost circulation material and additional solid additives, for example. Additional liquid additives, if any, may be added to the base fluid as desired prior to, or after, combination with the dry blend. This mixture may be agitated for a sufficient period of time to form a slurry. It will be appreciated by those of ordinary skill in the art, with the benefit of this disclosure, other suitable techniques for preparing treatment fluids may be used in accordance with embodiments of the present disclosure.

In some embodiments, the methods of the present disclosure may include introducing at least a portion of the treatment fluids into a loss zone or other flowpath and causing or allowing the treatment fluid to at least partially plug the loss zone. In some embodiments, the treatment fluids may be introduced into the wellbore to prevent the loss of aqueous or non-aqueous fluids into loss zones such as voids, vugular zones, perforations, and natural or induced fractures. In certain embodiments, the treatment fluids may form a non-flowing, intact mass inside the loss zone which plugs the zone and inhibits loss of subsequently pumped drilling fluid, which allows for further drilling. For example, in certain embodiments, the treatment fluid may function as a plug that is placed into an annulus of the wellbore and prepares the formation for placement of a second (e.g., cementitious) composition. In certain embodiments, the treatment fluid may be introduced into the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof. In some embodiments, one or more treatment fluids may at least partially plug a loss zone. In certain embodiments, a treatment fluid including at least one viscoelastic surfactant, a divalent salt, a metal salt, a metal oxide, and a lost circulation material of the present disclosure may at least partially plug a loss zone.

In some embodiments, the methods of the present disclosure may include foaming the treatment fluid by incorporating air, nitrogen, an appropriate foamer, glass spheres, or any combination thereof into the fluid. In some embodiments, the methods of the present disclosure may include foaming the lost circulation materials by incorporating air, nitrogen, an appropriate foamer, glass spheres, or any combination thereof into the fluid. In certain embodiments, foaming the treatment fluid may increase the volume of the treatment fluid or lost circulation materials to allow the plugging of a larger loss zone. In other embodiments, foaming the treatment fluid may reduce the cost of the treatment fluid or lost circulation materials. In certain embodiments, foaming the treatment fluid may introduce air bubbles that may lower the thermal conductivity of the treatment fluid.

In some embodiments, the treatment fluid or lost circulation materials of the present disclosure may be removed from the subterranean formation and/or the loss zone.

In certain embodiments, the lost circulation material may be acid soluble. For example, in some embodiments, the lost circulation material may at least partially degrade or dissolve in response to contact with an acidic fluid. In some embodiments, the lost circulation material may degrade or dissolve in response to a wellbore condition. For example, the lost circulation material may dissolve or degrade in response to at least one of a temperature, pressure, pH, salinity, solvency, and/or the presence of enzymes. In certain embodiments, the lost circulation material may degrade or dissolve in response to exposure to an aqueous or non-aqueous fluid with an acidic pH. For example, in certain embodiments, a treatment fluid including an aqueous base fluid, at least one viscoelastic surfactant, at least one component selected from the group consisting of: a divalent salt, a metal salt, a metal oxide, and any combination thereof, and a lost circulation material may be introduced into the wellbore followed by a second treatment fluid including an acidic fluid (e.g., an acidic pill), which may be allowed to contact the lost circulation material, triggering the lost circulation material to dissolve or degrade. In certain embodiments, the acidic fluid may include an organic acid. In some embodiments, the rate at which the lost circulation material degrades or dissolves may depend on the ambient downhole environment to which the lost circulation material is subjected (e.g., temperature, presence of moisture, oxygen, microorganisms, enzymes, pH, pressure, the like, and combinations thereof).

In certain embodiments, the lost circulation material may be used to form a filter cake and/or plug in at least a portion of a subterranean formation that can be selectively dissolved and removed from the wellbore. In some embodiments, the filter cake and/or plug may be formed in a reservoir or production zone of the subterranean formation. In certain embodiments, a second treatment fluid including an acid is introduced into the subterranean formation and allowed to contact at least a portion of the filter cake or plug. In certain embodiments, at least the portion of the filter cake or plug that contacts the second treatment fluid at least partially degrades in response to contacting the second treatment fluid.

In certain embodiments, the treatment fluids of the present disclosure may be suitable for use at a variety of temperatures, pH levels, water salinities, and mineralogies of subterranean formations. Additionally, the treatment fluids of the present disclosure may be suitable for a variety of subterranean formations, including, but not limited to shale formations and carbonate formations. In certain embodiments, the subterranean formation may have a bottom hole temperature of from about 66° C. (150° F.) to about 204° C. (400° F.). In certain embodiments, the subterranean formation may have a bottom hole temperature of at least 177° C. (350° F.).

The methods and compositions of the present disclosure may be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments. In certain embodiments, a treatment fluid may be introduced into a subterranean formation. In some embodiments, the treatment fluid may be introduced into a wellbore that penetrates a subterranean formation. In certain embodiments, a wellbore may be drilled and the treatment fluid may be circulated in the wellbore during, before, or after the drilling. In some embodiments, the treatment fluid may be introduced into a subterranean formation via a single flow path (e.g., drill pipe, annulus, etc.). Introduction of the treatment fluids of the present disclosure may in certain embodiments include delivery via any of a tube, umbilical, pump, gravity, and combinations thereof. The treatment fluids of the present disclosure may, in various embodiments, be delivered downhole (e.g., into the wellbore) or into top-side flowlines/pipelines or surface treating equipment. For example, in certain embodiments, the treatment fluids of the present disclosure may be applied to a subterranean formation and/or wellbore using batch treatments, squeeze treatments, continuous treatments, and/or combinations thereof. In some embodiments, the treatments fluid including an aqueous base fluid, at least one viscoelastic surfactant, a divalent salt, a metal salt, a metal oxide and a lost circulation material may be applied to a subterranean formation as a high fluid loss squeeze treatment.

In some embodiments, the treatment fluids of the present disclosure may carry out a variety of subterranean treatments, including but not limited to, preflush treatments, afterflush treatments, hydraulic fracturing treatments, acidizing treatments, sand control treatments (e.g., gravel packing), "frac-pack" treatments, wellbore clean-out treatments, drilling operations, and other operations where a treatment fluid may be useful. Such treatment fluids may include, but are not limited to, drilling fluids, preflush fluids, afterflush fluids, fracturing fluids, acidizing fluids, gravel packing fluids, packer fluids, spacer fluids, and the like.

The treatment fluids disclosed herein may directly or indirectly affect one or more components or pieces of equipment associated with the preparation, delivery, recapture, recycling, reuse, and/or disposal of the treatment fluids of the present disclosure. For example, the methods and compositions of the present disclosure may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of treatment fluids, and any sensors (i.e., pressure and temperature), gauges, and/or combinations thereof, and the like. The treatment fluids of the present disclosure may also directly or indirectly affect the various downhole equipment and tools that may come into contact with the treatment fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), wiper balls, wiper darts, pigs, logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. In some embodiments, the treatment fluid is introduced into a wellbore using one or more pumps.

Figure 2:
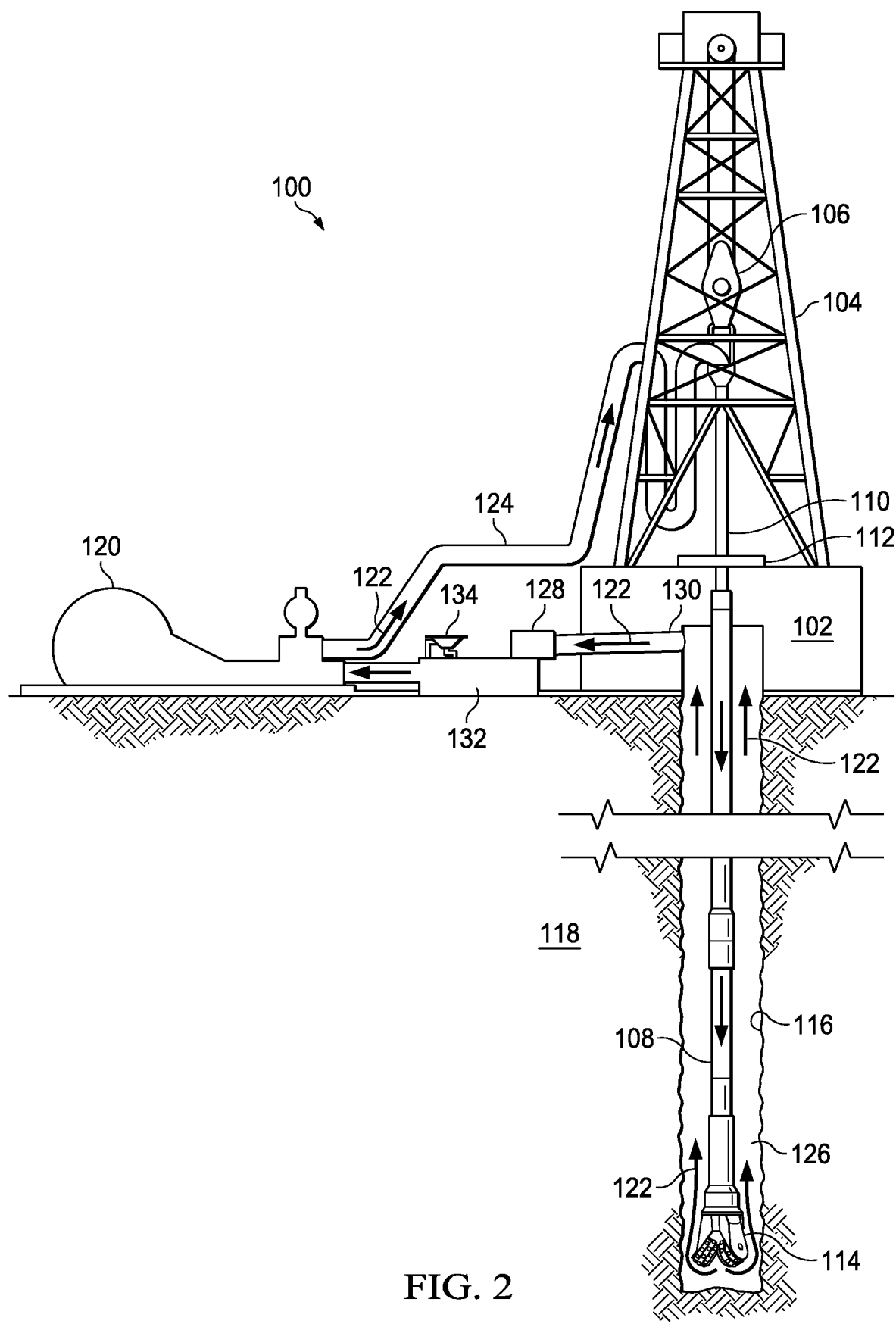
FIG. 2 is a schematic diagram of a system that may deliver treatment fluids and/or lost circulation materials of the present disclosure to a downhole location in accordance with certain embodiments of the present disclosure.

For example, and with reference to FIG. 2, the treatment fluids of the present disclosure may directly or indirectly affect one or more components or pieces of equipment associated with an exemplary wellbore drilling assembly 100, according to one or more embodiments. It should be noted that while FIG. 2 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates wellbore fluid 122 (e.g., a drilling fluid or a lost circulation pill described herein) through a feed pipe 124 and to the kelly 110, which conveys the wellbore fluid 122 downhole through the interior of the drill string 108 and through one or more orifices in the drill bit 114 (or optionally through a bypass or ports (not shown) along the drill string and above the drill bit 114). The wellbore fluid 122 is then circulated back to the surface via an annulus 126 defined between the drill string 108 and the walls of the borehole 116. At the surface, the recirculated or spent wellbore fluid 122 exits the annulus 126 and may be conveyed to one or more fluid processing unit(s) 128 via an interconnecting flow line 130. After passing through the fluid processing unit(s) 128, a "cleaned" wellbore fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed treatment fluids may be added to the wellbore fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the treatment fluids of the present disclosure may be added to the wellbore fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the treatment fluids of the present disclosure may be stored, reconditioned, and/or regulated until added to the wellbore fluid 122.

As mentioned above, the treatment fluids of the present disclosure may directly or indirectly affect the components and equipment of the drilling assembly 100. For example, the treatment fluids of the present disclosure may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary treatment fluids.

The treatment fluids of the present disclosure may directly or indirectly affect the pump 120, which representatively includes any conduits, pipelines, trucks, tubulars, and/or pipes used to fluidically convey the treatment fluids downhole, any pumps, compressors, or motors (e.g., topside or downhole) used to drive the treatment fluids into motion, any valves or related joints used to regulate the pressure or flow rate of the treatment fluids, and any sensors (i.e., pressure, temperature, flow rate, etc.), gauges, and/or combinations thereof, and the like. The treatment fluids of the present disclosure may also directly or indirectly affect the mixing hopper 134 and the retention pit 132 and their assorted variations.

The treatment fluids of the present disclosure may also directly or indirectly affect the various downhole equipment and tools that may come into contact with the treatment fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The treatment fluids of the present disclosure may also directly or indirectly affect any downhole heat exchangers, valves and corresponding actuation devices, tool seals, packers and other wellbore isolation devices or components, and the like associated with the wellbore 116. The treatment fluids of the present disclosure may also directly or indirectly affect the drill bit 114, which may include, but is not limited to, roller cone bits, PDC bits, natural diamond bits, any hole openers, reamers, coring bits, etc.

An embodiment of the present disclosure is a method including introducing a treatment fluid into a wellbore penetrating at least a portion of a subterranean formation including a loss zone, the treatment fluid including an aqueous base fluid, at least one viscoelastic surfactant, at least one component selected from the group consisting of: a divalent salt, a metal salt, a metal oxide, and any combination thereof, and a lost circulation material; and allowing the treatment fluid to at least partially plug the loss zone.

Another embodiment of the present disclosure is a treatment fluid including an aqueous base fluid; at least one viscoelastic surfactant; at least one component selected from the group consisting of: a divalent salt, a metal salt, a metal oxide, and any combination thereof; and a lost circulation material.

Another embodiment of the present disclosure is a method including introducing a first treatment fluid into a wellbore penetrating at least a portion of a subterranean formation, the first treatment fluid including an aqueous base fluid; at least one viscoelastic surfactant; at least one component selected from the group consisting of: a divalent salt, a metal salt, a metal oxide, and any combination thereof; and a lost circulation material; forming a filter cake or a plug including at least a portion of the lost circulation material in at least the portion of the subterranean formation; introducing a second treatment fluid including an acid into the wellbore; and allowing the second treatment fluid to contact at least a portion of the filter cake or plug, wherein at least the portion of the filter cake or plug at least partially degrades in response to contacting the second treatment fluid.

Another embodiment of the present disclosure is a method including introducing a treatment fluid into a wellbore penetrating at least a portion of a subterranean formation including a loss zone, the treatment fluid including an aqueous base fluid, at least one viscoelastic surfactant, at least one component selected from the group consisting of: a divalent salt, a metal salt, a metal oxide, and any combination thereof, and a lost circulation material; and allowing the treatment fluid to at least partially plug the loss zone, wherein the aqueous base fluid is water. Optionally in this embodiment or any other embodiment disclosed herein, the divalent salt is calcium chloride ($CaCl_2$). Optionally in this embodiment or any other embodiment of the present disclosure, the metal salt is selected from the group consisting of: $MgSO_4$, $MgSO_4.2H_2O$, $MgSO_4.4H_2O$, $MgSO_4.5H_2O$, $MgSO_4.6H_2O$, $MgSO_4.7H_2O$, $MgSO_4.11H_2O$, and any combination thereof. Optionally in this embodiment or any other embodiment of the present disclosure, the metal salt is magnesium sulfate heptahydrate ($MgSO_4\ 7H_2O$). Optionally in this embodiment or any other embodiment of the present disclosure, the metal oxide is magnesium oxide (MgO). Optionally in this embodiment or any other embodiment of the present disclosure, the treatment fluid includes the metal salt and the metal oxide each present in a concentration of about 10% to about 20% by weight of the treatment fluid. Optionally in this embodiment or any other embodiment of the present disclosure, the lost circulation material includes at least one engineered composite solution, at least one reticulate foam, and at least one acid soluble shell.

Another embodiment of the present disclosure is a treatment fluid including an aqueous base fluid; at least one viscoelastic surfactant; at least one component selected from the group consisting of: a divalent salt, a metal salt, a metal oxide, and any combination thereof; and a lost circulation material, wherein the aqueous base fluid is water. Optionally in this embodiment or any other embodiment disclosed herein, the divalent salt is calcium chloride ($CaCl_2$). Optionally in this embodiment or any other embodiment of the present disclosure, the metal salt is selected from the group consisting of: $MgSO_4$, $MgSO_4.2H_2O$, $MgSO_4.4H_2O$, $MgSO_4.5H_2O$, $MgSO_4.6H_2O$, $MgSO_4.7H_2O$, $MgSO_4.11H_2O$, and any combination thereof. Optionally in this embodiment of the present disclosure, the metal salt is magnesium sulfate heptahydrate ($MgSO_4\ 7H_2O$). Optionally in this embodiment or any other embodiment of the present disclosure, the metal oxide is magnesium oxide (MgO). Optionally in this embodiment or any other embodiment of the present disclosure, the treatment fluid includes the divalent salt, the metal salt, and the metal oxide. Optionally in this embodiment or any other embodiment of the present disclosure, the lost circulation material includes at least one engineered composite solution, at least one reticulate foam, and at least one acid soluble shell.

Another embodiment of the present disclosure is a method including introducing a first treatment fluid into a wellbore penetrating at least a portion of a subterranean formation, the first treatment fluid including an aqueous base fluid; at least one viscoelastic surfactant; at least one component selected from the group consisting of: a divalent salt, a metal salt, a metal oxide, and any combination thereof; and a lost circulation material; forming a filter cake or a plug including at least a portion of the lost circulation material in at least the portion of the subterranean formation; introducing a second treatment fluid including an acid into the wellbore; and allowing the second treatment fluid to contact at least a portion of the filter cake or plug, wherein at least the portion of the filter cake or plug at least partially degrades in response to contacting the second treatment fluid, wherein the acid includes an organic acid. Optionally in this embodiment or any other embodiment disclosed herein, the filter cake or plug is formed in a production zone of the subterranean formation. Optionally in this embodiment or any other embodiment of the present disclosure, the lost circulation material includes at least one engineered composite solution, at least one reticulate foam; and at least one acid soluble shell.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

The following examples demonstrate the plugging effectiveness and acid solubility of lost circulation materials according to some embodiments of the present disclosure. For each of the examples below, one or more treatment fluids for squeeze treatment were generally prepared as follows: calcium chloride ($CaCl_2$) was added to water and mixed at a low shear rate. A viscoelastic surfactant (ACAR-13019 from Nouryon, a zwitterion that is a betaine or a sulfobetaine) was added, and the mixture was sheared at low speed. This was followed by addition of $MgSO_4\ 7H_2O$ and MgO. Finally, one or more lost circulation materials were added.

Example 1

In this example, the effectiveness of a squeeze treatment using treatment fluids with formulations shown in Table 1 was examined.

Approximately 60 ppb of a lost circulation material including an engineered composite solution, a reticulate foam M, a reticulate foam C, an acid soluble shell M and an acid soluble shell C was included in the treatment fluids shown in Table 1. The treatment fluids were used in a high fluid loss squeeze treatment to plug a 20 mm fracture at a temperature of 200° F. (93° C.). Fracture sizes throughout refer to the fracture width (for example, 2.6 mm and 20 mm fracture sizes), unless the fracture is circular, in which case the fracture size refers to the fracture diameter (for example, 22 mm, 31.7 mm and 40 mm fracture sizes). The observations regarding plugging effectiveness of the formulations are described in Table 2.

TABLE 1

Treatment Fluid Formulations

| Component | #1 | #2 | #3 | #4 | #5 | #6 | #7 | #8 |
|---|---|---|---|---|---|---|---|---|
| Water (mL) | 187 | 187 | 187 | 187 | 187 | 187 | 187 | 187 |
| Viscoelastic surfactant(ACAR-13019) (mL) | 0 | 0 | 0 | 11.2 | 11.2 | 11.2 | 11.2 | 11.2 |
| $CaCl_2$ (g) | 0 | 0 | 0 | 0 | 9.37 | 0 | 9.37 | 0 |
| $MgSO_4 7H_2O$ (g) | 0 | 56 | 0 | 56 | 56 | 56 | 0 | 0 |
| MgO (g) | 0 | 56 | 0 | 56 | 56 | 56 | 56 | 56 |
| Engineered composite solution (BaraBlend ®-665 LCM) (ppb) | 20 | 20 | 20 | 20 | 20 | 20 | 20 | 20 |
| Reticulate foam M (BaraLock ®-666 LCM, medium size) (ppb) | 0.5 | 0.5 | 0.5 | 0.5 | 0.5 | 0.5 | 0.5 | 0.5 |
| Reticulate foam C (BaraLock ®-666 LCM, course size) (ppb) | 0.5 | 0.5 | 0.5 | 0.5 | 0.5 | 0.5 | 0.5 | 0.5 |
| Acid soluble shell M (medium oyster shells) (ppb) | 20 | 20 | 20 | 20 | 20 | 20 | 20 | 20 |
| Acid soluble shell C (course oyster shells) (ppb) | 20 | 20 | 20 | 20 | 20 | 20 | 20 | 20 |
| Xanthan gum (g) | 0 | 0 | 1 | 0 | 0 | 0 | 0 | 0 |

TABLE 2

Test results for a high fluid loss squeeze treatment on a 20 mm fracture size

| | Treatment Fluid Formulation | | | | | | | |
|---|---|---|---|---|---|---|---|---|
| | #1 | #2 | #3 | #4 | #5 | #6 | #7 | #8 |
| Observation | Compatibility, settling | Compatibility, settling | Compatibility, settling | Compatibility, settling | Flowable and mixable | Partially thick but flowable | Partially thick but flowable | Partially thick but flowable |
| Filter cake | Friable and soft cake | Solid and well shaped | System collapse | Friable and soft cake | Solid and well shaped | Squeezed into receiver | Squeezed into receiver | Approximately 32 mm |
| Plug-breaking pressure | 0 | 3500-4000 psi | 0 | 0 | 3500-4000 psi | ~950 psi | Some deflection observed | 1500-1750 psi |
| Conclusion | Failed | Failed | Failed | Failed | Passed | Failed | Failed | Passed |

Table 2 shows that formulations #5 and #8 passed the plugging test for a 20 mm fracture size at 200° F. (93° C.). Furthermore, formulation #5, which includes water, a viscoelastic surfactant, $CaCl_2$, $MgSO_4$ $7H_2O$ and MgO demonstrated the highest plug-breaking pressure. Formulation #8, which includes water, a viscoelastic surfactant, and MgO also passed the high fluid loss squeeze treatment test. This Example demonstrates that a lost circulation material can be effective when it is included in a treatment fluid including an aqueous base fluid, a viscoelastic surfactant, and at least one of a divalent salt, a metal salt and a metal oxide.

Example 2

In this example, the effectiveness of a squeeze treatment using the treatment fluid shown in Table 3 was tested. The formulation shown in Table 3 (formulation #9) was used in a high fluid loss squeeze treatment to plug a 40 mm fracture at a temperature of 260° F. (127° C.). The observations regarding plugging effectiveness of formulation #9 are described in Table 4.

TABLE 3

Components of Formulation #9

| Component | Amount |
|---|---|
| Water (mL) | 256 |
| Viscoelastic surfactant (ACAR-13019) (mL) | 2.5 |
| $CaCl_2$ (g) | 9.37 |
| $MgSO_4$ $7H_2O$ (g) | 56 |
| MgO (g) | 56 |
| Engineered composite solution (BaraBlend ®-665 LCM) (ppb) | 60 |
| Reticulate foam M (BaraLock ®-666 LCM, medium size) (ppb) | 1 |
| Reticulate foam C (BaraLock ®-666 LCM, course size) (ppb) | 2 |
| Acid soluble shell M (medium oyster shells) (ppb) | 20 |
| Acid soluble shell C (course oyster shells) (ppb) | 20 |

TABLE 4

Test results for a high fluid loss squeeze treatment using
formulation #9 on a 40 mm fracture size

| Observation | Flowable and mixable |
|---|---|
| Filter cake thickness, mm | ~32 |
| Plug-breaking pressure, psi | 3500-4000 |
| Total Volume, mL | 350 |
| Density, ppg | 11.4 |
| Tested at temperature, °F. | 260 |
| Conclusion | Passed |

Table 4 shows that formulation #9, which includes water, a viscoelastic surfactant, $CaCl_2$, $MgSO_4 \cdot 7H_2O$, MgO, and components of a lost circulation material different to those in Table 1, passed the plugging test for a 40 mm fracture size.

Rheology testing also was performed on formulation #9 without the lost circulation material components (i.e., only the water, viscoelastic surfactant, divalent salt, metal salt and metal oxide components) using a Model 35 viscometer (Fann Instrument Company). The viscometer measures the viscosity of fluid at various temperatures and shear rates. The treatment fluid was centrifuged to reduceany air entrapment, and then loaded into the viscometer. The tests were conducted at room temperature (approximately 72° F. (22° C.)) and 120° F. (49° C.) at atmospheric pressure (14.7 psi). The rheology profile of the fluid was measured at shear rates of 3 $sec^{-1}$, 6 $sec^{-1}$, 100 $sec^{-1}$, 200 $sec^{-1}$, 300 $sec^{-1}$, and 600 $sec^{-1}$. Table 5 shows the results of the rheology testing. The plastic viscosity (PV), yield point (YP) and gel strength were also determined, and are reported in Table 5.

TABLE 5

Rheology test results for formulation #9
without lost circulation materials

| | Apparent Viscosity, mPa · s or cP | |
|---|---|---|
| Shear rate ($sec^{-1}$) | Room temperature | 120° F. |
| 600 | 108 | 80 |
| 300 | 90 | 60 |
| 200 | 65 | 47 |
| 100 | 57 | 34 |
| 6 | 25 | 9 |
| 3 | 18 | 6 |
| Other parameters | | |
| Plastic Viscosity (PV), cP | 18 | 20 |
| Yield Point (YP), lbs 100 $ft^{-2}$ | 72 | 40 |
| 10' Gel, lbs 100 $ft^{-2}$ | 21 | 6 |
| 10" Gel, lbs 100 $ft^{-2}$ | 21 | 6 |

This Example demonstrates that the treatment fluids of the present disclosure can be used effectively with different lost circulation materials, which may be selected depending on the fracture size to be treated.

Example 3

Figure 3:
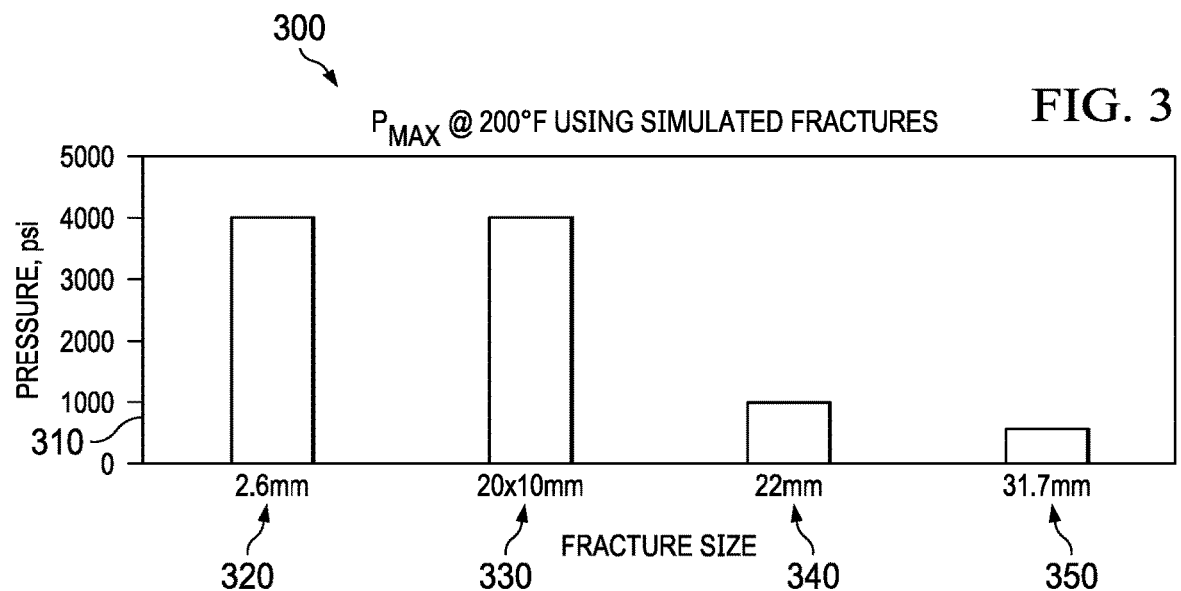
FIG. 3 is a plot of data relating to the plug breaking pressure at 200° F. of laboratory simulated fractures plugged with a treatment fluid including a lost circulation material in accordance with certain embodiments of the present disclosure.

In this example, the effectiveness of formulation #5 shown in Table 1 at plugging fractures of different sizes when used in a high fluid loss squeeze treatment at 200° F. (93° C.) was tested. The results of these tests are shown in FIG. 3. Referring now to FIG. 3, plot 300 shows the plug-breaking pressure in psi on axis 310 for simulated fractures of fracture sizes of 2.6 mm (320), 20×10 mm (330), 22 mm (340) and 31.7 mm (350). FIG. 3 shows that for at least fracture sizes of 2.6 mm and 20×10 mm, the plug-breaking pressure maximum ($P_{max}$) at 200° F. (93° C.) during a high fluid loss squeeze treatment is expected to be about 4000 psi. This Example demonstrates that a lost circulation material included in a treatment fluid including an aqueous base fluid, at least one viscoelastic surfactant, a divalent salt, a metal salt and a metal oxide may be effective at treating a range of fracture sizes when used in a high fluid loss squeeze treatment.

Example 4

Figure 4:
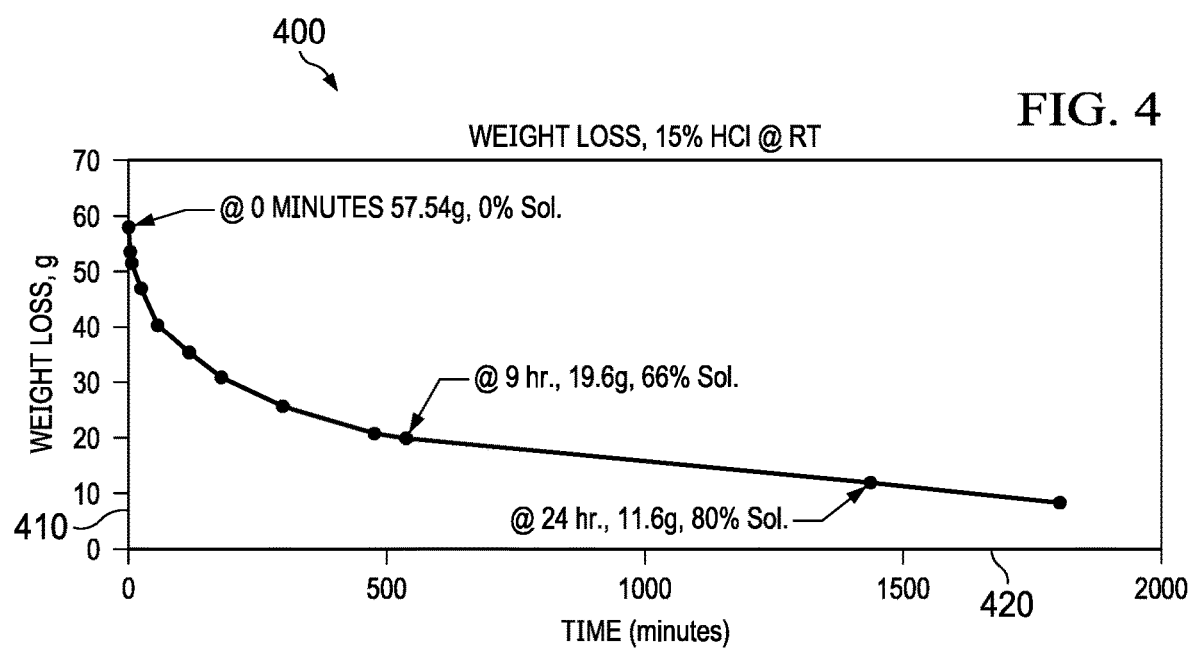
FIG. 4 is a plot of data relating to the weight loss of a lost circulation material in accordance with certain embodiments of the present disclosure.

In this example, the acid degradability of a set plug of formulation #5 shown in Table 1 was tested in an acid dissolution test. A set plug of formulation #5 was soaked in water to obtain an initial wet weight, followed by immersion in 150 mL 15% HCl at 200° F. (93° C.) for 16 h. The plug did not achieve acid solubility in 150 mL 15% HCl as there was not enough acid present. The plug was then split in half and soaked in 350 mL of 15% HCl at room temperature (approximately 72° F. (22° C.)) and its weight loss was monitored. The half of the plug became increasingly dissolved after 3-9 hours. After 9 hours, a half plug of formulation #5 was at least partially dissolved in acid. The results of this test are further shown in FIG. 4. Referring now to FIG. 4, plot 400 shows the weight loss in g on axis 410 against time in minutes on axis 420 for the half plug of formulation #5 when soaked in 350 mL 15% HCl at room temperature (RT; approximately 72° F. (22° C.)). Plot 400 shows that at a time of 0 minutes, the half plug had a weight of 57.54 g and was 0% dissolved. Plot 400 also shows that at a time of 540 minutes (9 hours), the half plug had a weight of 19.6 g and was 66% dissolved. Plot 400 further shows that at a time of 1440 minutes (24 hours), the half plug had a weight of 11.6 g and was 80% dissolved. FIG. 4 demonstrates that a plug of formulation #5 is expected to be at least 80% dissolved in 15% HCl after 30 h at room temperature (approximately 72° F. (22° C.)).

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing a treatment fluid into a wellbore penetrating at least a portion of a subterranean formation including a loss zone, the treatment fluid comprising:
   an aqueous base fluid,
   at least one viscoelastic surfactant, at least one component selected from the group consisting of: a divalent salt, a metal salt, a metal oxide, and any combination thereof, and a lost circulation material;

wherein the treatment fluid comprises the metal salt and the metal oxide each in an amount of about 10% to about 20%, by weight, based on the weight of the treatment fluid and an amount insufficient to form a set cement, and allowing the treatment fluid to at least partially plug the loss zone.

2. The method of claim 1, wherein the aqueous base fluid is water.

3. The method of claim 1, wherein the divalent salt is calcium chloride ($CaCl_2$)).

4. The method of claim 1, wherein the metal salt is selected from the group consisting of: $MgSO_4$, $MgSO_4.2H_2O$, $MgSO_4.4H_2O$, $MgSO_4.5H_2O$, $MgSO_4.6H_2O$, $MgSO_4.7H_2O$, $MgSO_4.11H_2O$, and any combination thereof.

5. The method of claim 1, wherein the metal salt is magnesium sulfate heptahydrate ($MgSO_4\ 7H_2O$).

6. The method of claim 1, wherein the metal oxide is magnesium oxide (MgO).

7. The method of claim 1, wherein the lost circulation material comprises:

at least one engineered composite solution;

at least one reticulate foam; and at least one acid soluble shell.

8. A treatment fluid comprising:

an aqueous base fluid;

at least one viscoelastic surfactant;

at least one component selected from the group consisting of: a divalent salt, a metal salt, a metal oxide, and any combination thereof; and a lost circulation material, wherein the treatment fluid comprises the metal salt and the metal oxide each in an amount of about 10% to about 20%, by weight, based on the weight of the treatment fluid and an amount insufficient to form a set cement.

9. The treatment fluid of claim 8, wherein the aqueous base fluid is water.

10. The treatment fluid of claim 8, wherein the divalent salt is calcium chloride ($CaCl_2$)).

11. The treatment fluid of claim 8, wherein the metal salt is selected from the group consisting of: $MgSO_4$, $MgSO_4.2H_2O$, $MgSO_4.4H_2O$, $MgSO_4.5H_2O$, $MgSO_4.6H_2O$, $MgSO_4.7H_2O$, $MgSO_4.11H_2O$, and any combination thereof.

12. The treatment fluid of claim 8, wherein the metal salt is magnesium sulfate heptahydrate ($MgSO_4.7H_2O$).

13. The treatment fluid of claim 8, wherein the metal oxide is magnesium oxide (MgO).

14. The treatment fluid of claim 8, wherein the treatment fluid comprises the divalent salt, the metal salt, and the metal oxide.

15. The treatment fluid of claim 8, wherein the lost circulation material comprises:

at least one engineered composite solution;

at least one reticulate foam; and at least one acid soluble shell.

16. A method comprising:

introducing a first treatment fluid into a wellbore penetrating at least a portion of a subterranean formation, the first treatment fluid comprising:

an aqueous base fluid, at least one viscoelastic surfactant;

at least one component selected from the group consisting of: a divalent salt, a metal salt, a metal oxide, and any combination thereof, and a lost circulation material, wherein the treatment fluid comprises the metal salt and the metal oxide each in an amount of at least about 2 times less than required to set;

forming a filter cake or a plug comprising at least a portion of the lost circulation material in at least the portion of the subterranean formation;

introducing a second treatment fluid comprising an acid into the wellbore; and allowing the second treatment fluid to contact at least a portion of the filter cake or plug, wherein at least the portion of the filter cake or plug at least partially degrades in response to contacting the second treatment fluid.

17. The method of claim 16, wherein the acid comprises an organic acid.

18. The method of claim 16, wherein the filter cake or plug is formed in a production zone of the subterranean formation.

19. The method of claim 16, wherein the lost circulation material comprises:

at least one engineered composite solution;

at least one reticulate foam; and at least one acid soluble shell.

* * * * *